(12) United States Patent
Huibers

(10) Patent No.: US 7,055,961 B2
(45) Date of Patent: Jun. 6, 2006

(54) LIGHT RECAPTURE PROJECTION SYSTEM

(75) Inventor: Andrew G. Huibers, Palo Alto, CA (US)

(73) Assignee: Reflectivity, INC, Sunnyvale, CA (US)

( * ) Notice: Subject to any disclaimer, the term of this patent is extended or adjusted under 35 U.S.C. 154(b) by 0 days.

(21) Appl. No.: 11/169,545

(22) Filed: Jun. 28, 2005

(65) Prior Publication Data

US 2005/0254017 A1    Nov. 17, 2005

Related U.S. Application Data

(62) Division of application No. 10/444,716, filed on May 23, 2003.

(60) Provisional application No. 60/383,153, filed on May 23, 2002.

(51) Int. Cl.
*G03B 21/14* (2006.01)
*G03B 21/28* (2006.01)
*G03B 21/00* (2006.01)
*F21V 7/00* (2006.01)
*G02B 5/22* (2006.01)

(52) U.S. Cl. ............... 353/84; 353/31; 353/99; 359/885; 362/298

(58) Field of Classification Search ............. 353/20, 353/31, 84, 99; 359/362, 885; 362/298; 385/147

See application file for complete search history.

(56) References Cited

U.S. PATENT DOCUMENTS

| 3,686,528 A | 8/1972 | Sheets |
| 3,827,782 A | 8/1974 | Boudouris et al. |
| 4,230,095 A | 10/1980 | Winston |
| 4,355,350 A | 10/1982 | Mader |
| 4,912,614 A | 3/1990 | Goldenberg |
| 4,915,479 A | 4/1990 | Clarke |
| 5,192,962 A | 3/1993 | Nishida et al. |
| 5,613,767 A | 3/1997 | Hamanaka et al. |
| 5,911,489 A | 6/1999 | Watanabe |
| 6,186,648 B1 | 2/2001 | Baker et al. |
| 6,231,199 B1 | 5/2001 | Li |
| 6,312,144 B1 | 11/2001 | Li |
| 6,318,885 B1 | 11/2001 | Li et al. |
| 6,356,700 B1 * | 3/2002 | Strobl ............... 385/147 |
| 6,375,327 B1 * | 4/2002 | Holman et al. ......... 353/20 |
| 6,565,235 B1 | 5/2003 | Li |
| 6,587,269 B1 | 7/2003 | Li |
| 6,771,325 B1 | 8/2004 | Dewald et al. |
| 6,795,243 B1 | 9/2004 | McGettigan et al. |
| 2001/0008470 A1 | 7/2001 | Dewald |
| 2001/0035720 A1 | 11/2001 | Guthrie et al. |

(Continued)

OTHER PUBLICATIONS

Holger Moench, et al., 41.1: Invited Paper: Higher Output, More Compact UHP Lamp Systems, SID 02 DIGEST, pp. 1160-1163

(Continued)

*Primary Examiner*—Melissa Jan Koval
(74) *Attorney, Agent, or Firm*—Gregory R. Muir

(57) ABSTRACT

A projection system is disclosed comprising a light source, a first reflector proximate the light source, a second reflector proximate the light source, a light pipe, a color sequencing device a spatial light modulator and a target. The color sequencing device preferably directs three or more colors onto the spatial light modulator at a time. Some light is reflected from the color sequencing device back through the light pipe and is again reflected at the reflector at the light source before returning to the light pipe and color sequencing device. The brightness of the projection system is thereby increased.

78 Claims, 7 Drawing Sheets

U.S. PATENT DOCUMENTS

| | | |
|---|---|---|
| 2002/0135862 A1 | 9/2002 | Dewald |
| 2003/0099108 A1 | 5/2003 | Slobodin |
| 2003/0128341 A1 | 7/2003 | Li |
| 2003/0198050 A1 | 10/2003 | Yamazaki |
| 2005/0122575 A1* | 6/2005 | Pentico et al. .............. 359/362 |
| 2005/0162853 A1* | 7/2005 | Jain ........................... 362/298 |

OTHER PUBLICATIONS

CERMAX Lamp Engineering Guide, 1998 ILC Technology-p. 3.

* cited by examiner

LIGHT RECAPTURE PROJECTION SYSTEM

CROSS-REFERENCE TO RELATED PATENT APPLICATIONS

This U.S. patent application is a divisional patent application of co-pending U.S. patent application Ser. No. 10/444,716 filed May 23, 2003, which claims priority to U.S. provisional application 60/383,153 to Huibers filed May 23, 2002, the subject matter of each being incorporated herein by reference.

TECHNICAL FIELD OF THE INVENTION

The present invention is in the field projection systems, and in particular in the field of projection systems with sequential color illumination of a spatial light modulator—that forms a color image on a target. More particularly, the present invention is directed to increasing light throughput in such sequential color projection systems, and in particular utilizing scrolling color and light recapture via recycling through the light source.

SUMMARY OF THE INVENTION

In accordance with one embodiment of the invention a projection system is disclosed, comprising: a point source of light and a reflector proximate to the point source of light; a color sequencer, wherein the point source of light, reflector and color sequencer are arranged such that the light from the point source of light is directed so as to be incident on the color sequencer, and wherein at least 10% of the light that is reflected back from the color sequencer impinges on the reflector proximate to the point source of light and is reflected back so as to again be incident on the color sequencer.

In accordance with another aspect of the invention, a projection system is disclosed, comprising: an arc lamp; a spherical reflector proximate to the arc lamp; a color sequencer; wherein the arc lamp, spherical reflector and color sequencer are arranged in the projection system such that the light from the arc lamp is directed so as to be incident on the color sequencer, and wherein at least a portion of light that is reflected back from the color sequencer impinges on the spherical reflector so as to reflected and again be incident on the color sequencer.

In accordance with a further aspect of the invention, a projection system is disclosed, comprising: a UHP lamp having a dichroic coating; a color sequencer; wherein the UHP lamp with dichroic coating and color sequencer are arranged in the projection system such that the light from the UHP lamp is directed so as to be incident on the color sequencer, and wherein at least a portion of light that is reflected back from the color sequencer impinges on the dichroic coating so as to reflected and again be incident on the color sequencer.

In accordance with a still further aspect of the invention, a light collecting system is disclosed comprising a color filter element; and a concentrated light source illuminating a color filter element; wherein a substantial portion of light that does not pass through said color filter element is reflected back to said light source, and subsequently is reflected back to said color filter element and then passes through a different location of said color filter element.

In accordance with yet another aspect of the invention, an optical system is disclosed comprising: a multi spectral light source; a reflector at the light source for reflecting light from the light source; a color sequencing device disposed to receive light from the reflector and that spatially passes some colors and reflects others back to the reflector, wherein at least 60% of the light that is reflected from the color sequencing device is directed back onto the reflector at the light source.

In accordance with yet another aspect of the invention, a projection system is disclosed comprising: a light source and a reflector proximate to the light source; a spatial light modulator; a color sequencer that provides three or more different colors onto the spatial light modulator at the same time; wherein the light source, reflector and color sequencer are arranged such that the light from the light source is directed so as to be incident on the color sequencer and has a first etendue, and wherein light reflected back from the color sequencer is incident on the reflector proximate to the light source and is reflected back so as to again be incident on the color sequencer with a second etendue less than 20% different from the first etendue.

DETAILED DESCRIPTION OF THE EMBODIMENTS

Figure 1:
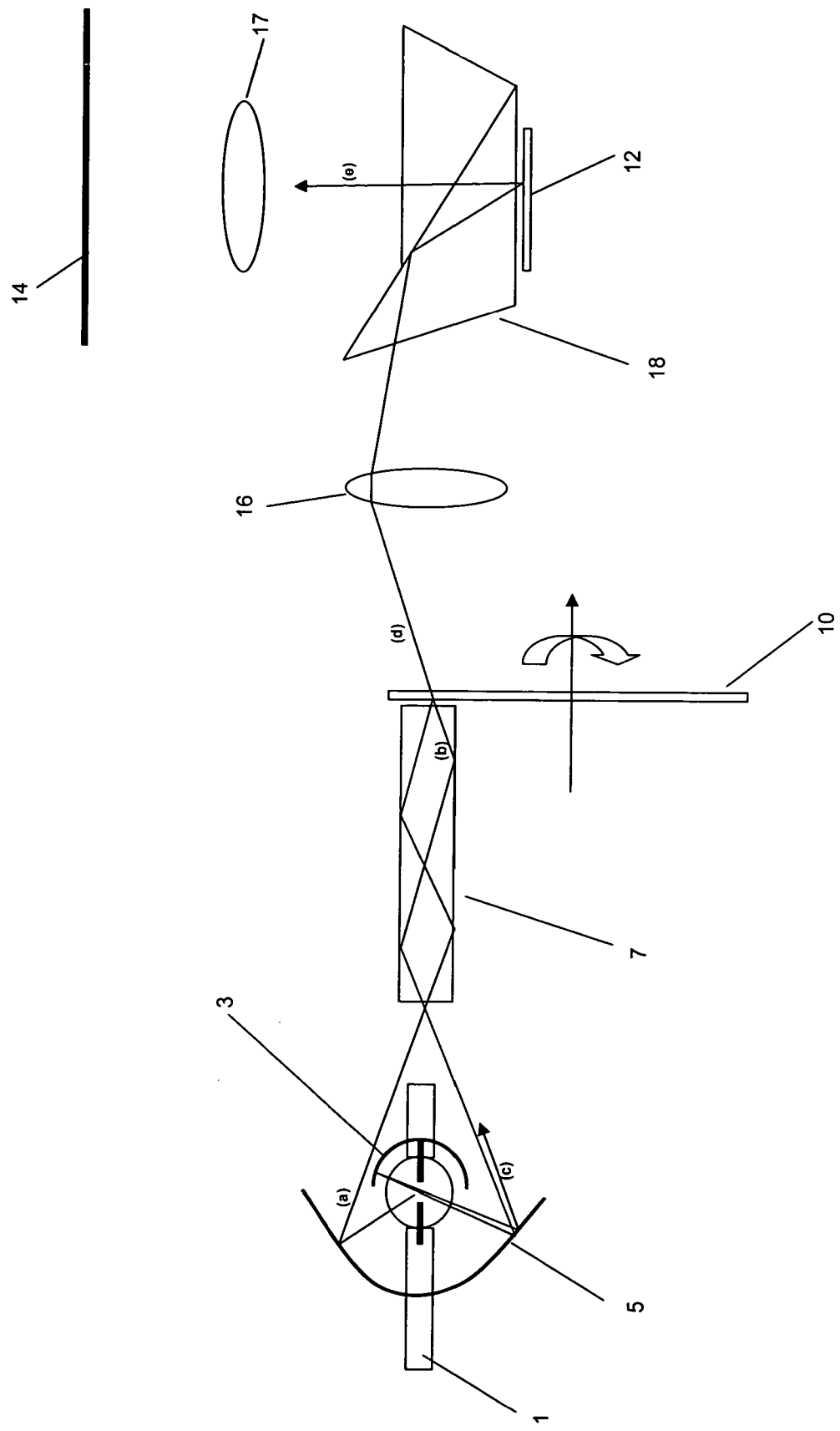
FIG. 1 is an illustration of a projection system in accordance with one embodiment of the invention.

The invention is described herein in relation to specific embodiments. Nevertheless, persons familiar with the field will appreciate that many variations exist in light of the embodiments described herein.

Sequential color systems (either full frame, partial frame, line or pixel based systems) are useful because the same physical pixels can be used to achieve all colors. By using an array of such pixels with a color sequencer that sequences light into colors, it is possible to use a single pixel array and achieve a color image on a target. In these systems a detector (e.g. the human eye) serves to integrate the sequential light coming zfrom the display pixel elements, provided that the colors are shown in sequence faster than the response time of the detector. Thus, a sequence of red, green and blue light onto a pixel array (or a sequence of a spatial combination of red, green and blue light), when sufficiently fast, will result in a full color image. Such a projected image may be a still image (office or conference presentation) or a moving image (home theater).

In some sequential systems, a color wheel having red, green and blue segments is rotated through a white light beam resulting in consecutive red, green and blue images on a light valve. The light valve can be, for example, a liquid crystal light valve (transmissive or reflective) or a MEMS (micro electromechanical systems) type light valve (diffraction grating or micromirror array). In some sequential color systems, such as the Philips rotating prism based color system (Jeffrey Shimizu, *Information Display*, "Philips Scrolling-Color LCoS Engine for HDTV Rear Projection", November 2001, pp. 14–19), the three colors are separated and then directed at a light valve (display panel) all at the same time with different colors being incident on different areas of the light valve. This has the advantage of using all of the light energy available (all of the red, green or blue light is potentially used all of the time). However, with the separate beams, the required panel size becomes quite large. In other words, the etendue (optical extent, which is the minimum area multiplied by the solid angle) of the illumination beam in the light valve illumination system is made bigger. Because of this, this type of system uses a very large light valve (larger than 1.1 inch diagonal), which increases both the light valve cost and the costs of the associated illumination and projection optics.

In another system, sequential color recapture (such as set forth in US patent applications 2002/0005914 to Tew, 2002/0135862 to Dewald, and 2001/0008470 to Dewald, the subject matter of each being incorporated herein by reference), a light pipe (also referred to as a light tunnel) has a mirrored internal surface with an aperture at one end (where light from the light source enters) and a color wheel having spiral bands of color disposed proximate to the other end. When white light passes through the light pipe and is incident on a particular band of the spiral color wheel (e.g. a red band), a color is transmitted (e.g. red light) with the remainder of the light (e.g. green and blue) being reflected back into the light pipe. Such reflected light is incident on the reflective surface (around the above mentioned aperture) at the other end of the light pipe and is again incident on the color wheel, with some of the green light that had been reflected now passing through a green band, some of the blue light now passing through a blue band. With multiple instantaneous reflections, much of the light that does not pass through the color wheel the first time will pass through adjacent bands after being reflected back into the light pipe. Though more light passes through the color wheel in such a system, because the exit of the light pipe is significantly larger than the entrance (due to the aperture at the light pipe entrance), the etendue is increased, yet the light recycling is incomplete, offering a compromised advantage.

Thus there is a need for a system that can recycle color without increasing beam size (and illumination light bundle etendue), and without significantly increasing system complexity.

This invention accomplishes color recycling by recycling light that is reflected from a changing color filter, such as a color wheel, drum, cone, or color selective panel (such as a Colorlink device), and directing back through the arc.

A first embodiment of the invention is illustrated in FIG. 1. Illustrated are a light source 1, such as an arc lamp, a first reflector 3, a second reflector 5, and a light pipe or tunnel 7. Forward light (light that is emitted by the arc lamp 1 in the direction going to the right in the figure) is reflected by the first reflector 3 back to the second reflector 5 via the arc lamp, and on to light pipe 7. First reflector 3 can be a spherical reflector as shown, or an elliptical or other reflector. The second reflector 5 can be an elliptical reflector as shown, or other suitable reflector (including a spherical or other reflector). Backward light from the light source 1 (light directed from the arc lamp to the left in the drawing) is focused first on the second reflector 2 and then enters light pipe 7. The light that is reflected by reflector 3 back through the arc lamp has been observed to be about 70% efficient because some parts of the arc plasma re-absorb the light. Reflector 3 can be a reflector disposed adjacent the arc lamp, or it can be a reflective coating coated directly on the side of the lamp.

After light is reflected from the second reflector 5, it enters the light pipe 7, passes therethrough and is incident on the color selective element 10—in this case a color wheel. The color selective element could be one of many types of optical elements that divide white light from the light source into individual color bands—either a moving part (cone, wheel, drum) or some other type of color selective device, for example one based on liquid crystals or MEMS. As mentioned above with respect to prior art color wheels, not all light will pass through the color selective element—some will be reflected back into the light pipe. In the present invention, this reflected light is reflected back through light pipe 7, is reflected from second reflector 5, through light source 1 and is finally incident on first reflector 3. Once incident on first reflector 3, the light is effectively "recycled" by being passed once again though the light source 1, via the second reflector 5 back into light pipe 7. This "recycled" light is once again incident on the color selective element with more passing through the second time (and third and fourth, etc.).

Light which passes the color selective element 10 is incident on the light valve 12. Light valve 12 is an array of pixels that are selectively actuated in analog or digital mode to direct light to target 14 (e.g. a viewing screen). Light valve 12 can be an array of for example liquid crystal cells or micromirrors. Also shown in FIG. 1 are condensing optics 16 (for focusing the light toward the light valve 12, projection optics 17, and TIR (total internal reflection) prisms 18. These optical elements can of course be of various designs (e.g. omit the TIR prisms 18, multiple lenses for either optics 16 or optics 17, etc.). As will be seen better in FIG. 6, multiple colors from the color sequencing element are incident on the light valve at the same time but in different areas of the light valve. As such, the filter wheel image is focused onto the light valve so that there are sharp transitions between colors, and the illumination colors at the valve correspond to the colors at the color filter element.

Figure 2:
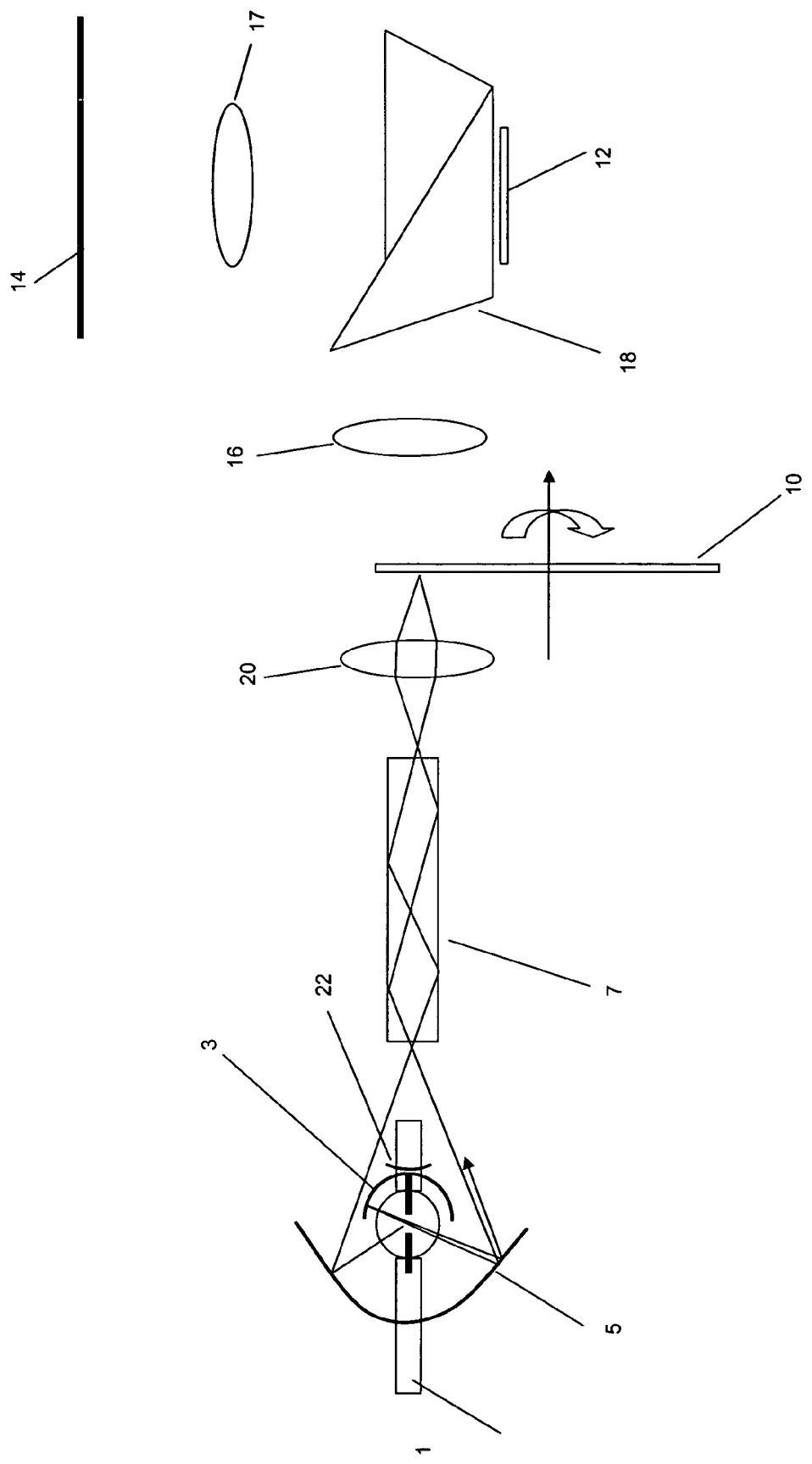
FIG. 2 is an illustration of a projection system in accordance with a second embodiment of the invention.

An alternative approach is shown in FIG. 2. As can be seen in this figure, an additional lens (or group of lenses) 20 is used to image the end of the light pipe onto the color wheel/filter. One practical issue with the color wheel is that it is difficult to get it close to the end of the light pipe. If it is spaced away from the light pipe, then some light will leak out at the edges. That is, some light which exit the light pipe at an angle and is located at the very edge of the light pipe (in FIG. 1) could reflect from the color wheel and not re-enter the light pipe. The extra lens of FIG. 2 allows the image of the light pipe exit exactly focus at the color wheel, so less light is lost. Also illustrated in FIG. 2 is a third reflector 22 at the light source. This third reflector reflects light coming back from light pipe 7 that does not pass around the light source toward reflector 5, but is incident on a back side of the light source. This third reflector, whether part of the light source or a separate reflective element, can be curved or planar and aids in the light recycling and thus overall brightness of the display.

Figure 3:
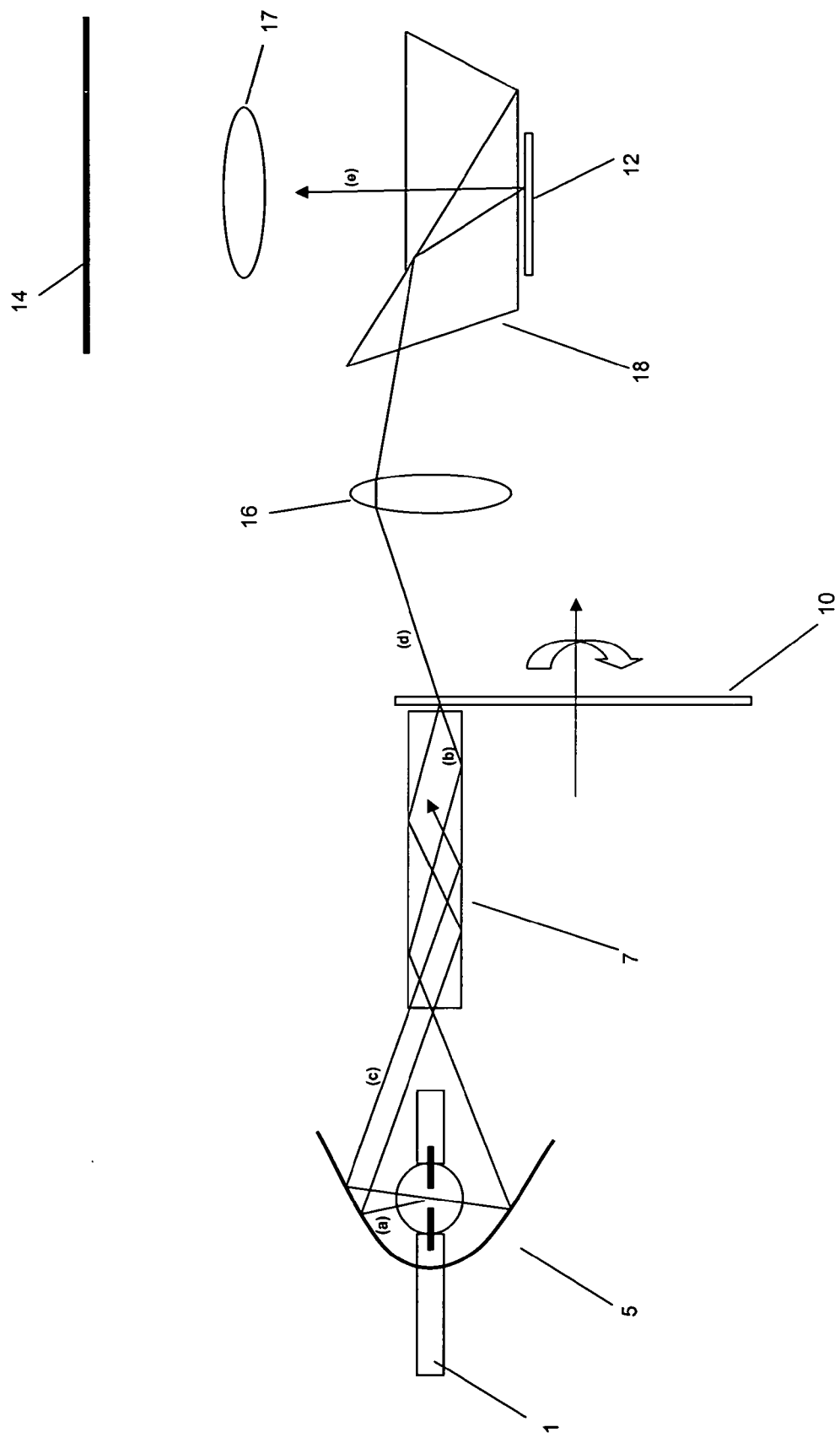
FIG. 3 is an illustration of a projection system in accordance with a third embodiment of the invention.
Figure 4:
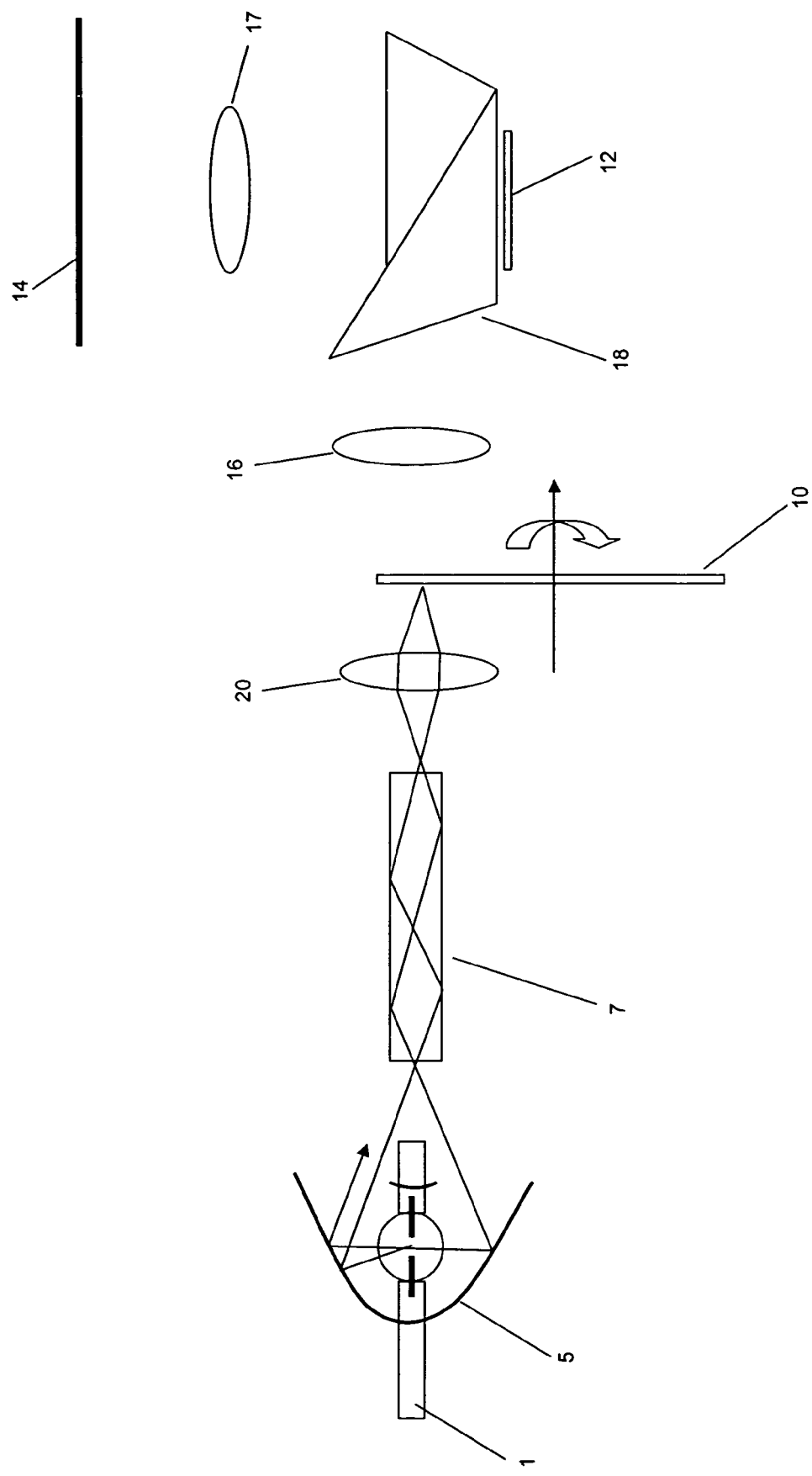
FIG. 4 is an illustration of a projection system in accordance with a fourth embodiment of the invention.
Figure 5:
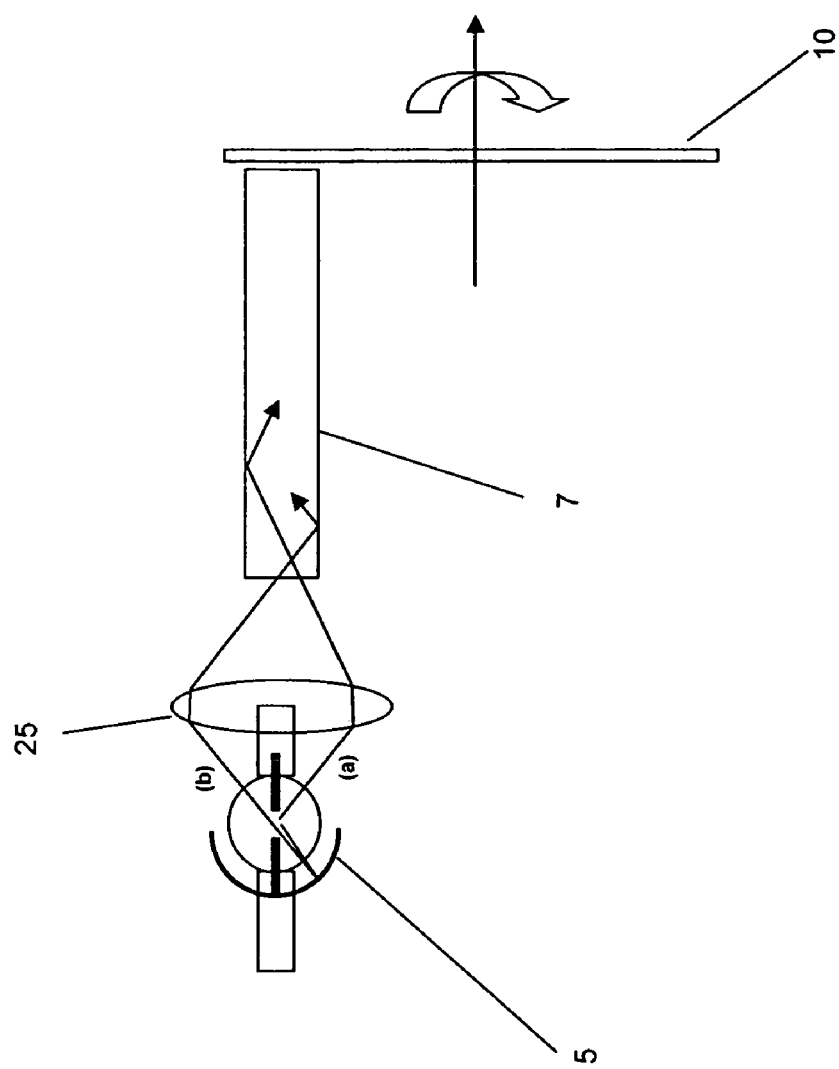
FIG. 5 is another embodiment of the invention where a spherical reflector is used.

FIGS. 3 and 4 are similar to FIGS. 1 and 2, respectively, but are embodiments where the first reflector 3 from FIGS. 1 and 2 is absent. FIG. 5 shows an embodiment in which a spherical lens is used to couple light to the light pipe. Reflector 5 in this embodiment is a spherical reflector.

Etendue (the extent of the beam) is not increased in the approach of this invention. Light that is not selected by a color filter element is sent back to the arc lamp which is configured so that the light will be reflected back into the illumination system. In an embodiment of the invention, any change in etendue is less than 20%; preferably less than 10%. This enables the valve size to remain small.

Figure 6:
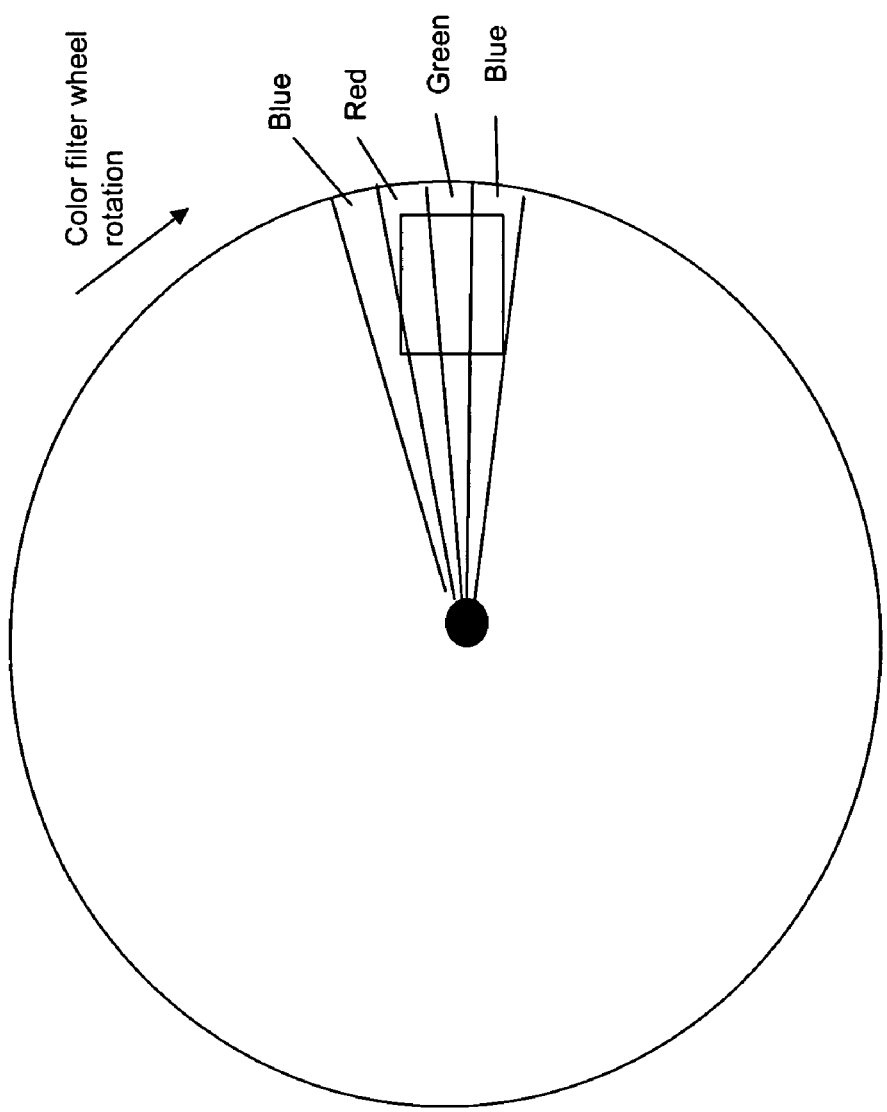
FIG. 6 is an illustration of the light pipe superimposed on the color wheel.

FIG. 6 shows what one type of color sequencing device—in this case a color wheel with thin "pie wedges" of different colors (e.g. red, green and blue—or red, green, blue and white or another less saturated light boost color) that could be placed at the end of the light pipe, a color wheel, will look like. A color wheel with spiral color bands could be used as mentioned above, or another design—though whatever design is selected more than one color (preferably three or more colors) should "overlap" the end of the light pipe at a time so as to take advantage of the color recycling (or at least allow more than one color—preferably three or more colors to be incident on the light valve at any one time). In FIG. 6, approximately 3 spokes, separating three colors, are shown superimposed on the light valve exit.

Figure 7A:
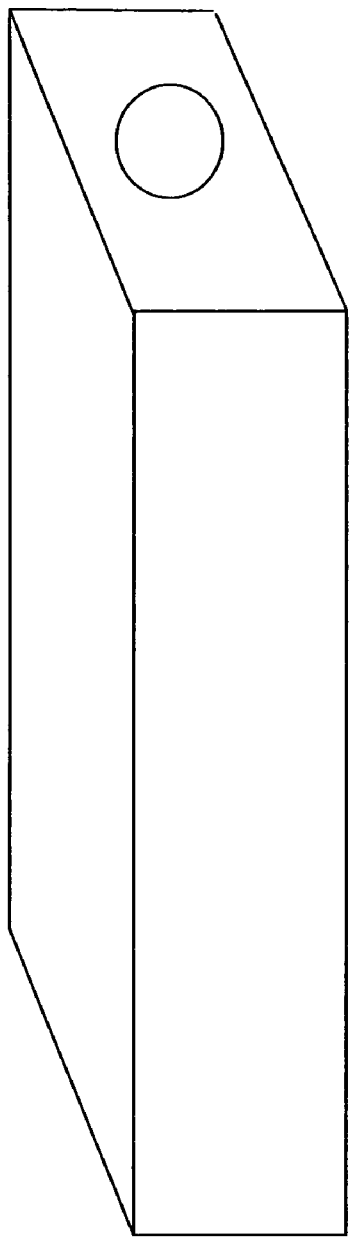
FIG. 7a and FIG. 7b are illustrations of the ends of exemplary light pipes that face towards the light source.
Figure 7B:
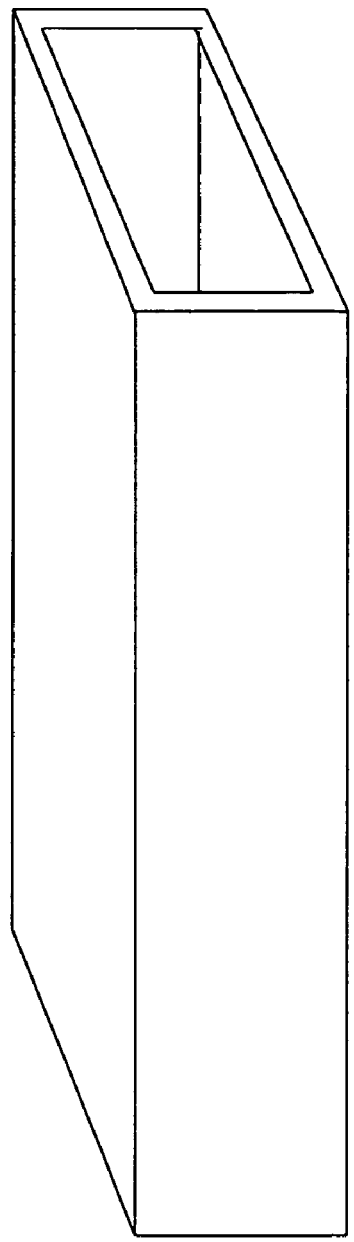

FIGS. 7a and 7b are illustrations of the end of the light pipe that faces towards the light source. FIG. 7a is an illustration of a prior art light pipe that comprises a closed end except for an aperture through which a beam of light from the light source enters into the light pipe. Light pipes with both types of openings facing the light source are known—however, till now, the opening of FIG. 7a was used with a color recycling type color sequencer (one that allows for multiple colors to be incident on a light valve at any one time), whereas the opening of FIG. 7b has been always used with a light valve where, except at color transitions, a single color is directed at the light pipe at any one time—and never three colors at any one time. The light pipe of FIG. 7b is used in the embodiments of the present invention. Though the opening need not be fully open as in FIG. 7b, no more than 50% of the area of the opening should be covered—preferably no more than 25%, and more preferably no covering at all, such as illustrated in this figure. By removing the restricted opening at the end of the light pipe, almost all of the light reflected from the color sequencing device back into the light pipe—passes out of the light pipe back to the light source. It is preferred that, if the opening is partly restricted, the restriction is not great—and at least 60% (preferably at least 70%, at least 80% or 90% or more) of the light that is reflected off of the color sequencing device will pass out of the light pipe to the light source though a lower percentage of light can reach the light source (10% or more, 20% or more, or 30% or more), the higher percentages are preferred. Also, the light pipe can have different entrance and exit shapes with a preferably smooth transition between the differently shaped ends of the pipe.

In the present invention, a highly reflective reflector can be positioned very close to the arc lamp burner. In one example of the invention, the light source is a UHP lamp with a reflective coating directly on the lamp. The reflective coating can be a dichroic coating—preferably one that reflects visible light but transmits light of other wavelengths. The coating or separate reflector 3 allows for the reflector 5 to focus light inside an angle of 20 degrees or less, or even 16 degrees or less. The arc length can be 1.3 mm or less, or even 1.0 mm or less. If a very short arc length is desired, an around 0.7 mm arc length can be used. A short arc length, combined with the reflector (or reflective coating) that redirects light back through the lamp, and combined with the color sequencing device as disclosed herein, results in a bright light beam incident on the light valve, which, due to the lower etendue of the system, allows for a small light valve thus increasing the brightness of the projected image.

The light valve can have a diameter of around 0.5 cm or less, or even around 0.4 cm or less, depending upon the optical system components selected.

There are many variations possible.

The light pipe or illumination system can be anamorphic.

This system can be used for either MEMS or LC devices, and in either transmissive or reflective mode.

The arc lamp could be rotated so that the arc lamp axis is perpendicular to the illumination optical system axis.

A parabolic arc lamp reflector could be used.

An illumination configuration similar to that used in liquid crystal display projection systems—with two sets of fly's eye lenses and/or polarization conversion being used (not illustrated). In such an embodiment, there is a color selective filter element that is imaged onto the valve, and which reflects unwanted light back into an arc lamp with high retro-reflection capability.

More than three colors (Red, Green, Blue) could be used to increase the color gamut (red, green, blue, magenta and yellow, for example).

Because the light coming back out the light pipe is spread out, it will more efficiently make its way through and back out of the arc, since it will not focus on the "hot spots".

The illumination system does not need to use a TIR prism. An approach using a field lens in front of the light valve, or light that converges onto the light valve, can also be used. Many known projection system configurations could be used with the present invention.

The invention disclosed herein is presented in preferred embodiments of projection system design to exemplify the inventive features, but the scope of the invention is much broader than illustrated with these preferred embodiments. The scope of the invention is intended to be broadly interpreted to cover the general field of projector design.

I claim:

1. A projection system, comprising:
    a point source of light;
    a first curved reflective surface of a first reflector;
    a second curved surface of a second reflector;
    wherein the first and second reflectors are disposed proximate to the point source, wherein both said first and second reflective surfaces face the point source;
    a color sequencer, wherein the point source of light, first and second reflectors and color sequencer are ranged such that the light from the point source of light is directed so as to be incident on the color sequencer, and wherein at least 10% of the light that is reflected back from the color sequencer impinges on the first and second reflective surfaces and is reflected back to the color sequencer so as to again be incident on the color sequencer.

2. The projection system of claim 1, wherein at least 20% of the light that is reflected bank from the color sequencer impinges on the first and second reflective surfaces and is reflected back so as to again be incident on the color sequencer.

3. The projection system of claim 1, wherein the point source of light is an arc lamp.

4. The projection system of claim 1, wherein the color sequencer is a color wheel, drum, cone or color selective panel.

5. The projection system of claim 1, further comprising a second reflector facing said reflector and disposed to direct light to the color sequencer.

6. The projection system of claim 2, wherein at least 30% of the light that is reflected back from the color sequencer impinges on the first and second reflective surfaces.

7. The projection system of claim 3, wherein the reflector is a spherical reflector proximate the arc lamp.

8. The projection system of claim 3, further comprising a light valve that is a micromirror array for modulating the light so as to produce an image.

9. The projection system of claim 5, further comprising a light pipe.

10. The projection system of claim 5, wherein light reflected from the color sequencer is incident on both said reflector and said second reflector so as to be again directed on the color sequencer.

11. The projection system of claim 5, wherein the second reflector is an elliptical reflector.

12. The projection system of claim 7, wherein the spherical reflector is a reflective coating on the glass bulb of the arc lamp.

13. The projection system of claim 7, further comprising first optics disposed between the arc lamp and the color sequencer, wherein the first optics is positioned for focusing light from the arc lamp and reflector proximate to the arc lamp onto the color sequencer.

14. The projection system of claim 7, further comprising a light valve disposed to receive multi colored light from the light sequencer.

15. The projection system of claim 9, wherein said reflector is a spherical reflector.

16. The projection system of claim 13, further comprising a light pipe positioned between the first optics and the color sequencer.

17. The projection system of claim 14, wherein the color sequencer is capable of forming a spatial and temporal sequence of colors that are incident on the light valve.

18. The projection system of claim 14, further comprising second optics for focusing light from the color sequencer onto the light valve.

19. The projection system of claim 14, further comprising third optics for projection light from the light valve onto a target.

20. The projection system of claim 14, wherein the color sequencer is a color wheel capable of passing multiple colors onto the light valve at the same time.

21. The projection system of claim 15, wherein the second reflector is an elliptical reflector.

22. A projection system, comprising:
   an arc lamp having a first curved reflective surface;
   a spherical reflector proximate to the arc lamp, having a second curved reflector, wherein both said first and second reflective surfaces face the arc lamp;
   a color sequencer; wherein the arc lamp, spherical reflector and color sequencer are arranged in the projection system such that the light from the arc lamp is directed so as to be incident on the color sequencer, and wherein at least a portion of light that is reflected back from the color sequencer impinges on the spherical reflector so as to reflected and again be incident on the color sequencer; and
   a light pipe.

23. The projection system of claim 22, wherein at least 20% of the light that is reflected back from the color sequencer impinges on the spherical reflector proximate to the arc lamp and is reflected back so as to again be incident on the color sequencer.

24. The projection system of claim 22, wherein the arc lamp is a UHP burner.

25. The projection system of claim 22, wherein the color sequencer is a color wheel, drum, cone or color selective panel.

26. The projection system of claim 22, wherein the light valve is a micromirror array.

27. The projection system of claim 22, wherein light reflected from the color sequencer is incident on both said spherical reflector and said second reflector so as to be again directed on the color sequencer.

28. The projection system of claim 23, wherein at least 30% of the light that is reflected back from the color sequencer impinges on the spherical reflector proximate to the arc lamp.

29. The projection system of claim 24, wherein the spherical reflector is a reflective layer on the arc lamp.

30. The projection system of claim 29, wherein the spherical reflector is a reflective coating on the glass bulb of the arc lamp.

31. The projection system of claim 29, further comprising a light valve disposed to receive multi colored light from the light sequencer.

32. The projection system of claim 30, further comprising first optics disposed between the arc lamp and the color sequencer, wherein the first optics is positioned for focusing light from the arc lamp and spherical reflector proximate to the arc lamp onto the color sequencer.

33. The projection system of claim 31, wherein the color sequencer is capable of forming a spatial and temporal sequence of colors that are incident on the light valve.

34. The projection system of claim 31, further comprising second optics for focusing light from the color sequencer onto the light valve.

35. The projection system of claim 31, further comprising third optics for projection light from the light valve onto a target.

36. The projection system of claim 31, wherein the color sequencer is a color wheel capable of passing multiple colors onto the light valve at the same time.

37. The projection system of claim 32, further comprising a light pipe positioned between the first optics and the color sequencer.

38. An optical system comprising:
   a multi spectral light source;
   a first curved reflective surface of a first reflector;
   a second curved reflective surface of a second reflector;
   wherein the first and second reflectors are disposed proximate to the point source, and wherein both said first and second reflective surfaces face the point source;
   a color sequencing device disposed to receive light from the first and second reflective surfaces and that spatially passes some colors and reflects others back to the first and second curved reflective surfaces; and
   wherein at least 60% of the light that is reflected from the color sequencing device is directed back onto the first and second curved reflective surfaces at the light source.

39. The optical system of claim 38, wherein a light tunnel is provided between the light source and color sequencing device.

40. The optical system of claim 38, wherein the reflector is an elliptical reflector.

41. The optical system of claim 38, wherein the light source is an arc lamp having an arc length of 1 mm or less.

42. The optical system of claim 38, wherein the reflector is a spherical reflector.

43. The optical system of claim 38, further comprising focusing optics for focusing light from the color sequencing device on the light valve.

44. The optical system of claim 38, wherein at least 70% of the light that is reflected from the color sequencing device is directed back onto the first and second reflective surfaces at the light source.

45. The optical system of claim 39, further comprising a second reflector disposed to reflect light from the light source back through the light source and to the color sequencing device via the reflector.

46. The optical system of claim 43, further comprising projection optics for projecting an image from the light valve onto a target.

47. The optical system of claim 44, wherein at least 80% of the light that is reflected from the color sequencing device is directed back onto the first and second reflective surfaces at the light source.

48. The optical system of claim 45, wherein the second reflector lowers the etendue of the optical system.

49. The optical system of claim 45, wherein the second reflector is spherical reflector.

50. The optical system of claim 45, wherein the second reflector is an elliptical reflector.

51. The optical system of claim 45, further comprising a third reflector that reflect light into the light tunnel that exits the light tunnel but is not directed to said reflector.

52. The optical system of claim 45, wherein the light tunnel does not have a restricted opening.

53. The optical system of claim 45, wherein light is recycled back to the reflector while conserving etendue.

54. The optical system of claim 49, wherein the second reflector is a coating on the light source, the light source being an arc lamp.

55. A projection system, comprising:
a UHP lamp having a dichroic coating defining a first curved reflective surface;
a spherical reflector having a second curved reflective surface that is a reflective coating on a glass bulb of the UHP lamp;
wherein both said first and second reflective surfaces face the UHP lamp;
a color sequencer;
wherein the UHP lamp with dichroic coating, reflector, and color sequencer are arranged in the projection system such that the light from the UHP lamp is directed so as to be incident on the color sequencer, and wherein at least a portion of light that is reflected back from the color sequencer impinges on the dichroic coating so as to reflected and again be incident on the color sequencer.

56. The projection system of claim 55, wherein at least 10% of the light that is reflected back from the color sequencer impinges on the dichroic coating of the UHP lamp and is reflected back so as to again be incident on the color sequencer.

57. The projection system of claim 55, wherein the UHP lamp has an arc gap of 1 mm or less.

58. The projection system of claim 55, further comprising first optics disposed between the UHP lamp and the color sequencer, wherein the first optics is positioned for focusing light from the UHP lamp and spherical reflector proximate to the UHP lamp onto the color sequencer.

59. The projection system of claim 55, wherein the color sequencer is a color wheel, drum, cone or color selective panel.

60. The projection system of claim 55, wherein the light valve is a micromirror array.

61. The projection system of claim 55, further comprising a second reflector facing said spherical reflector and disposed to direct light to the color sequencer.

62. The projection system of claim 56, wherein at least 30% of the light that is reflected back from the color sequencer impinges on the dichroic coating of the UHP lamp.

63. The projection system of claim 57, wherein the dichroic coating forms a spherical reflective surface.

64. The projection system of claim 58, further comprising a light pipe positioned between the first optics and the color sequencer.

65. The projection system of claim 61, further comprising a light pipe.

66. The projection system of claim 61, wherein light reflected from the color sequencer is incident on both said spherical reflector and said second reflector so as to be again directed on the color sequencer.

67. The projection system of claim 63, further comprising a light valve disposed to receive multi colored light from the light sequencer.

68. The projection system of claim 65, wherein said reflector is a spherical mirror element disposed adjacent to the UHP lamp.

69. The projection system of claim 67, wherein the color sequencer is capable of forming a spatial and temporal sequence of colors that are incident on the light valve.

70. The projection system of claim 67, further comprising second optics for focusing light from the color sequencer onto the light valve.

71. The projection system of claim 67, wherein the color sequencer is a color wheel capable of passing multiple colors onto the light valve at the same time.

72. The projection system of claim 68, wherein the second reflector is an elliptical reflector.

73. The projection system of claim 70, further comprising third optics for projection light from the light valve onto a target.

74. A projection system, comprising:
a light source;
a first curved reflective surface of a first reflector;
a second curved reflective surface of a second reflector;
wherein the first and second reflectors are disposed proximate to the point source, wherein both said first and second reflective surfaces face the point source;
a spatial light modulator;
a color sequencer that provides three or more different colors onto the spatial light modulator at the same time;
wherein the light source, reflector and color sequencer are arranged such that the light from the light source is directed so as to be incident on the color sequencer, and wherein at least 60% of the light that is reflected back from the color sequencer to be incident on the first and second reflective surfaces and is reflected back so as to again be incident on the color sequencer.

75. The projection system of claim 74, wherein at least 70% of the light that is reflected back from the color sequencer to be incident on the first and second reflective surfaces proximate to the light source and is reflected back so as to again be incident on the color sequencer.

76. The projection system of claim 75, wherein at least 80% of the light that is reflected back from the color sequencer to be incident on the first and second reflective surfaces proximate to the light source and is reflected back so as to again be incident on the color sequencer.

77. A projection system, comprising:
a point light source;
a first curved reflective surface of a first reflector
a second curved reflective surface of a second reflector;
wherein the first and second reflectors are disposed proximate to the point source, and wherein both said first and second reflective surfaces face the point source;
a spatial light modulator;
a color sequencer that provides three or more different colors onto the spatial light modulator at the same time;
wherein the light source, reflector and color sequencer are arranged such that the light from the light source is directed so as to be incident on the color sequencer and has a first etendue, and wherein light reflected back from the color sequencer is incident on the first and second reflectors proximate to the point light source and is reflected back so as to again be incident on the color sequencer with a second etendue less than 20% different from the first etendue.

78. The projection system of claim 77, wherein the second etendue less than 10% different from the first etendue.

* * * * *